United States Patent [19]

Migita

[11] Patent Number: 5,455,425
[45] Date of Patent: Oct. 3, 1995

[54] X-RAY DETECTOR OF MULTI-CHANNEL TYPE IONIZATION CHAMBER

[75] Inventor: Shinichi Migita, Ryugasaki, Japan

[73] Assignee: Hitachi Medical Corporation, Tokyo, Japan

[21] Appl. No.: 214,757

[22] Filed: Mar. 18, 1994

[30] Foreign Application Priority Data

Mar. 18, 1993 [JP] Japan .................................. 5-058164

[51] Int. Cl.⁶ .............................. G01T 1/185; H01J 47/02
[52] U.S. Cl. ........................................................ 250/385.1
[58] Field of Search ........................................... 250/385.1

[56] References Cited

FOREIGN PATENT DOCUMENTS 58-166282  10/1983  Japan ................................. 250/385.1
60-131750   7/1985  Japan ................................. 250/385.1

*Primary Examiner*—Constantine Hannaher
*Attorney, Agent, or Firm*—Antonelli, Terry, Stout & Kraus

[57] ABSTRACT

An X-ray detector with a multi-channel type ionization chamber has plural signal plate electrodes and plural high voltage plate electrodes respectively disposed in parallel to and alternating with the signal plate electrodes all of the plate electrodes being mounted between a pair of insulators. A conductive rubber member is provided between one of the insulators and the high voltage plate electrodes, and a long conductive member is provided along the conductive rubber member at a position where the long conductive member contacts the rubber member, but does not contact the high voltage plate electrodes. Thereby, the amount of X-rays is detected accurately in respective channels in spite of the simple construction of the X-ray detector.

12 Claims, 4 Drawing Sheets

X-RAY DETECTOR OF MULTI-CHANNEL TYPE IONIZATION CHAMBER

BACKGROUND OF THE INVENTION

Present invention relates to an X-ray detector with a multi-channel type ionization chamber having a plurality of high voltage plate electrodes supplied with a high voltage and a plurality of signal plate electrodes for taking out a signal corresponding to an amount of detected X-rays, the high voltage plate electrodes and the signal plate electrodes being arranged in parallel to and alternating with each other.

The high voltage plate electrodes are connected in parallel to an electrically conductive rubber member which is disposed in an arranging direction of the plate electrodes and is supplied with a high voltage, and at the same time, the high voltage plate electrodes are fixedly supported by disposing the conductive rubber member between the high voltage plate electrodes and an electrically insulating support member.

Such electrical connection by use of a conductive rubber member makes it easy to assemble an X-ray detector having a fine construction, and an example of such a detector is described in Japanese Patent Laid-open No. 58-168981 (1983).

However, in the X-ray detector having a construction as described above, a voltage drop in the high voltage plate electrode arises in relation to the distance from the end of the conductive rubber member which is connected to the high voltage source to a position at which the conductive rubber member is connected to the respective high voltage plate electrodes, because the conductive rubber has a significantly large resistance.

Such a voltage drop causes generation of voltage differences between the high voltages applied to the respective plate electrodes and makes it difficult to take out a signal which accurately reflects the amount of the X-rays which should be detected.

It is possible to decrease the resistance of the conductive rubber member; however, this creates the problem that the process for producing the conductive rubber member becomes complex and the elasticity of the rubber decreases so significantly that it becomes impossible to firmly support the plate electrodes on the insulating support member.

SUMMARY OF THE INVENTION

The present invention has been accomplished to overcome the above mentioned problem of the conventional technique.

An object of the present invention is to provide an X-ray detector with a multi-channel type ionization chamber having a plurality of high voltage plate electrodes and a plurality of signal plate electrodes for detecting an amount of X-rays accurately by feeding a predetermined constant voltage to the high voltage plate electrodes in a simple way using a conductive rubber member.

In order to attain the above object, in a X-ray detector with a multi-channel type ionization chamber having a plurality of high voltage plate electrodes supplied with a high voltage and a plurality of signal plate electrodes for taking out a signal corresponding to an amount of detected X-rays, which plate electrodes are arranged in parallel with each other, a pair of electrical insulators are provided to support the high voltage plate electrodes and the signal plate electrodes therebetween, and the high voltage plate electrodes are supplied with a high voltage through an electrically conductive rubber member and a further electrically conductive member connected to a high voltage source, both of which members are disposed between the high voltage plate electrodes and one of the insulators, so as to electrically connect the high voltage plate electrodes in parallel with the further conductive member through the conductive rubber member. Thereby, any difference between the voltage drops for the plurality of high voltage plate electrodes caused by the resistance of the conductive rubber member becomes remarkably small, so that a predetermined consistent high voltage is respectively applied to all of the high voltage plate electrodes in the respective channels, and the amount of X-rays is detected accurately in each channel.

DETAILED DESCRIPTION OF THE PREFERRED EMBODIMENT

Figure 2:
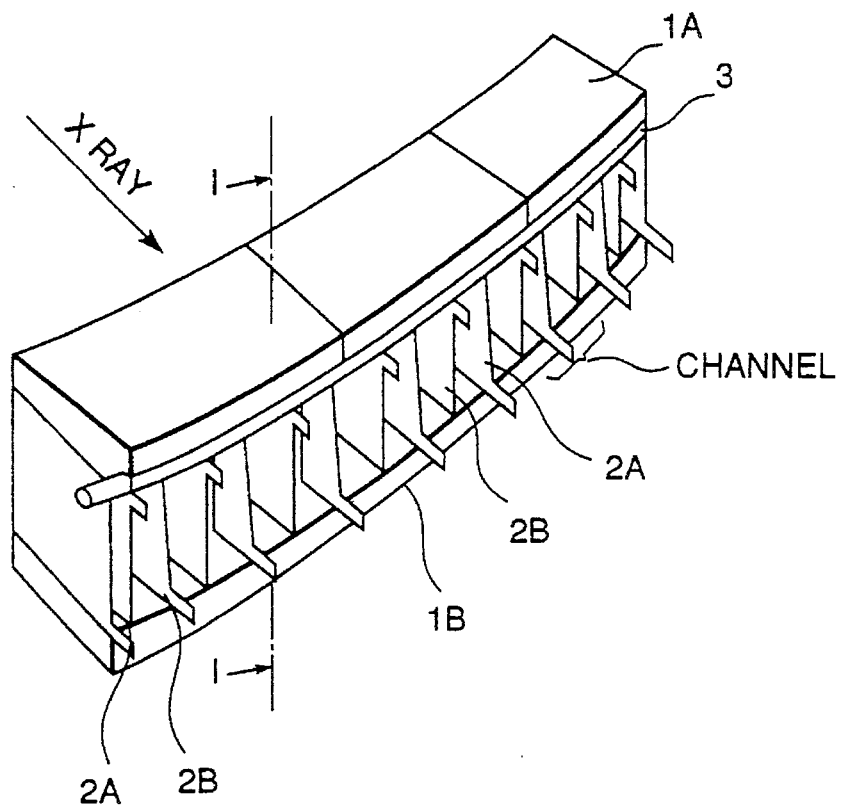
FIG. 2 shows a perspective view of the overall construction of an X-ray detector to which the present invention is applied.

In FIG. 2, showing a perspective view of the overall construction of an X-ray detector in accordance with the present invention, a pair of electrical insulators 1A, 1B, respectively shaped as plates, are disposed opposite each other in parallel relationship. The pair of insulators 1A, 1B are made of ceramics, for example, and an assembly including a pair of insulators 1A, 1B mounting high voltage plate electrodes 2A and signal plate electrodes 2B is generally referred to as an electrode block.

The high voltage plate electrodes 2A and signal plate electrodes 2B are supported between the pair of insulators 1A, 1B and are disposed in parallel and alternate with one another. The two spaces on either side of one of the signal plate electrodes 2B and between two successive high voltage plate electrodes 2A on opposite sides of the one signal plate electrode form one channel of the X-ray detector.

As the electrode block is disposed in Xenon gas, the spaces between the high voltage plate electrodes 2A and signal plate electrodes 2B are filled with Xenon gas. X-rays are irradiated into the spaces, as shown in FIG. 2 with an arrow, and the energy of the X-rays is absorbed by the Xenon gas. Thereby, the Xenon gas is separated into electrons and positively charged particles according to the amount of X-rays. The electrons and positively charged particles are separated by a force of an electrical field between the high voltage plate electrodes 2A and the signal plate electrodes 2B, and the electrons are caused to move towards the high voltage plate electrodes 2A, which are charged positively, and the positively charged particles of the Xenon gas are moved towards the signal plate electrodes 2B, which are charged negatively. Therefore, an electric current flows between the signal plate electrodes 2B and the high voltage plate electrodes 2A according to the amount of X-rays and an electric signal is taken out from the signal plate electrode 2B according to the magnitude of the detected electric current.

The high voltage plate electrodes 2A are connected in parallel to a long electrically conductive rubber member 3, which extends in the longitudinal direction of the insulators 1A, 1B and is disposed in contact with a long conductive member 51 (not shown in FIG. 2), extending along the conductive rubber member 3.

Figure 1:
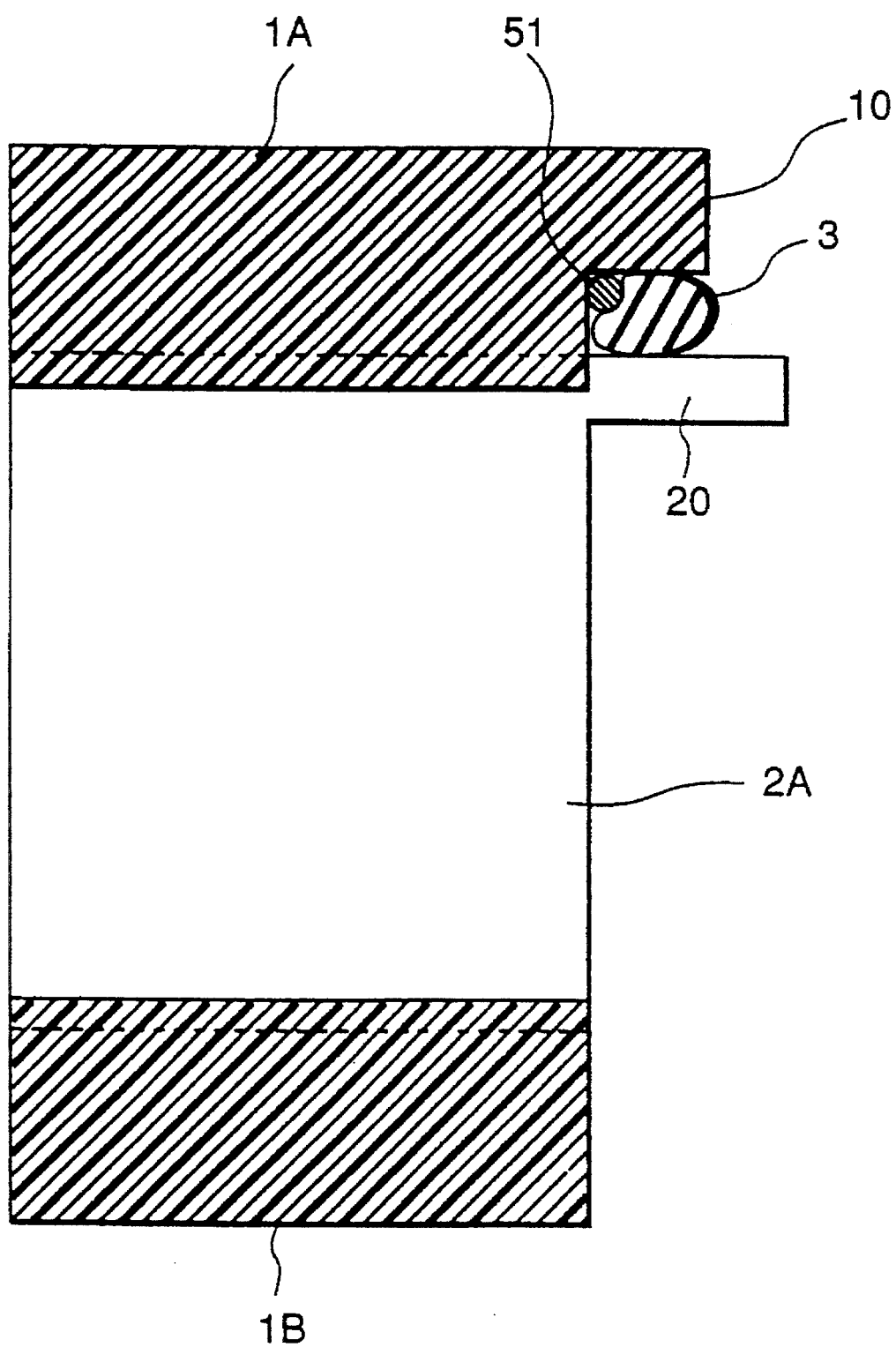
FIG. 1 shows a partial cross-sectional view of an embodiment of an X-ray detector in accordance with the present invention.

FIG. 1 shows a cross-sectional view of a section along line I—I' in FIG. 2.

A protruding portion 20 is integrally formed on an upper side of each high voltage plate electrode 2A, a protruding portion 10 is integrally formed on one side of the insulator 1A, and the conductive rubber member 3 is disposed between each protruding portion 10 and the protruding portion 20. On an inner corner formed by the protruding portion 10, where an upper side of the conductive rubber member 3 is disposed, a wire-like conductive member 51 is provided in close contact with the conductive rubber member 3 so as to be held in position by the protruding portions 10 and the conductive rubber member 3.

Figure 3:
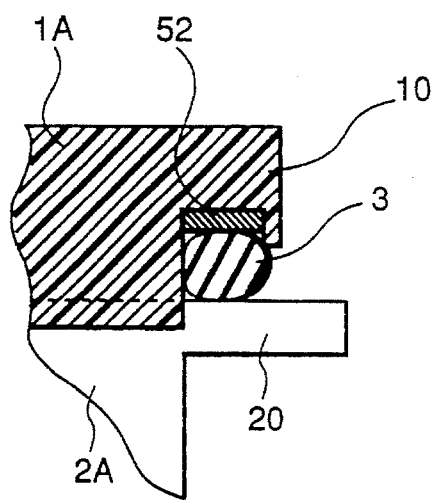
FIG. 3 shows a partial cross-sectional view of an another embodiment of an X-ray detector in accordance with the present invention.

In FIG. 3, which shows a partial cross-sectional view of an another embodiment of an X-ray detector in accordance with the present invention, a conductive member 52, shaped like a long plate, is disposed on the under side of the protruding portion 10 of the insulator 1A so as to contact the conductive rubber member 3. The plate-like conductive member 52 is connected to a high voltage source which is not shown in the figure and the conductive rubber member 3 is disposed in close contact with both the plate-like conductive member 52 and the protruding portion 20 of the high voltage plate electrode 2A. Therefore, the high voltage plate electrodes 2A are connected by the plate-like conductive member 52 in parallel through the conductive rubber member 3.

The plate-like conductive member 52 may be made of gilt formed by an electric gilding method.

Figure 4:
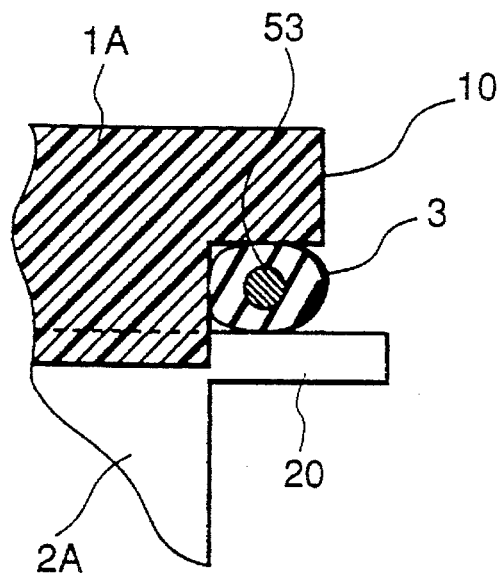
FIGS. 4 and 5 show partial cross-sectional views of further embodiments of an X-ray detector in accordance with the present invention.

In FIG. 4, which shows a partial cross-sectional view of another embodiment of an X-ray detector in accordance with the present invention, a wire-like conductive member 53 is buried in the conductive rubber member 3 along a central axis thereof and is connected to a high voltage source which is not shown in the figure. The conductive rubber member 3 is closely inserted between the protruding portion 10 of the insulator 1A and the protruding portion 20 of each high voltage plate electrode 2A. Therefore, the high voltage plate electrodes 2A are connected by the conductive member 53 in parallel through the conductive rubber member 3 in the same way as the previous embodiments.

Figure 5:
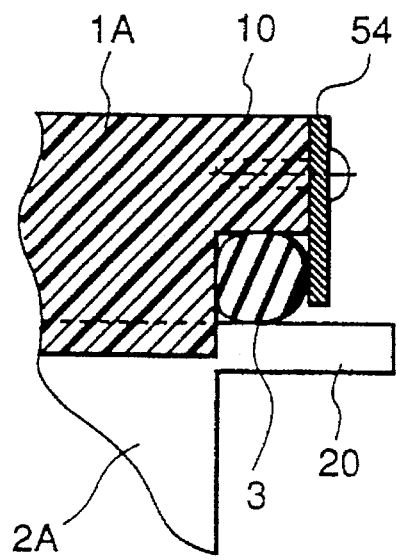

In FIG. 5, which shows a partial cross-sectional view of a further embodiment of an X-ray detector in accordance with the present invention, a long plate-like conductive member 54 is fixed by a screw to a side of the protruding portion 10 of the insulator 1A so as to restrain the conductive rubber member 3 and is connected to a high voltage source which is not shown in the figure. The conductive rubber member 3 is closely fixed in position between the protruding portion 10 of the insulator 1A and the protruding portion 20 of each high voltage plate electrode 2A by the conductive member 54 so as to prevent it from being pulled out. Therefore, the high voltage plate electrodes 2A are connected by the conductive member 54 in parallel through the conductive rubber member 3 in the same way as the other embodiments.

In the embodiment shown in FIGS. 1, 3, 4, 5, the electric resistances between the high voltage plate electrodes and the conductive members 51, 52, 53, 54 are constant and small in spite of the large resistance of the conductive rubber member, because the distance along the conductive rubber member between the high voltage plate electrodes and the further conductive member is are constant and short.

Therefore, fluctuation of the signal level generated by the voltage drops caused by the large resistance of the conductive rubber member is avoided and consistent voltages are applied to the high voltage plate electrodes in all channels which are respectively formed between respective pairs of high voltage plate electrodes. Thereby, the amount of X-rays is detected accurately in respective channels of the X-ray detector.

Figure 6:
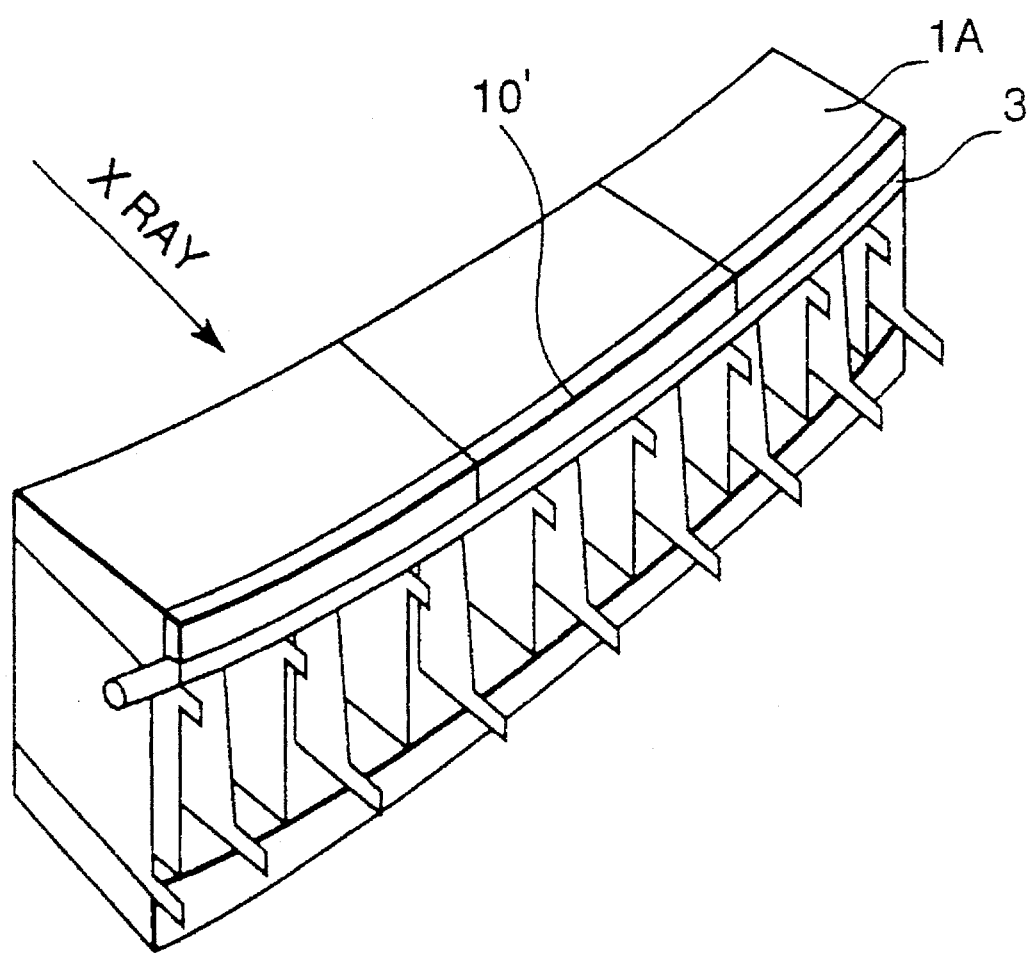
FIG. 6 shows a perspective view of still another embodiment of an X-ray detector in accordance with the present invention.

Further, in FIG. 6, a protruding portion 10' is formed separately and is mounted on one side of the insulator 1A. The conductive rubber member 3 is inserted between the protruding portion 10' and the protruding portions 20 of the high voltage plate electrodes 2A.

Further, the conductive member may be a metal wire, disposed along the conductive rubber member 3 at a lower side portion thereof and in contact with the conductive rubber member 3 and, but not in contact with the high voltage plate electrodes directly, so as to be connected to the high voltage plate electrodes 2A only through the conductive rubber member 3.

As stated above, in accordance with the present invention, the amount of X-rays is detected accurately in respective channels in spite of the simple construction of the X-ray detector.

I claim:

1. An X-ray detector with a multi-channel type ionization chamber having plural signal plate electrodes and plural high voltage plate electrodes respectively disposed in parallel to and alternating with the signal plate electrodes, said signal plate electrodes and said high voltage plate electrodes being mounted between a pair of insulators, comprising;

a conductive rubber member, disposed in a direction in which the signal plate electrodes and the high voltage plate electrodes are arranged, and provided between one of the insulators and the high voltage plate electrodes; and a long conductive member connected to a high voltage source and provided along the length of the conductive rubber member in contact therewith so as not to contact the high voltage plate electrodes.

2. An X-ray detector as defined claim 1, wherein said long conductive member is disposed between a protruding portion of said one of said insulators and a the conductive rubber member.

3. An X-ray detector as defined in claim 2, wherein said long conductive member has the shape of a plate.

4. An X-ray detector as defined in claim 2, wherein said long conductive member has the shape of a wire.

5. An X-ray detector as defined claim 1, wherein said long conductive member is disposed at a corner formed by a protruding portion of said one of said insulators and is disposed between said protruding portion and said conductive rubber member.

6. An X-ray detector as defined claim 1, wherein said long conductive member is shaped like a plate and is disposed between said one of said insulators and the conductive rubber member.

7. An X-ray detector as defined claim 1, wherein said long conductive member is shaped like a wire and is buried in the conductive rubber member along a central axis thereof.

8. An X-ray detector as defined claim 1, wherein said long conductive member is shaped like a plate and is fixed at a side of said one of said insulators so as to restrain the conductive rubber member against said one insulator.

9. An X-ray detector as defined in claim 8, wherein said conductive rubber member is disposed at a corner formed by a protruding portion of said one of said insulators and said long conductive member is secured to said protruding portion.

10. An X-ray detector as defined claim 1, wherein said long conductive member is made of gilt formed by an electric gilding method.

11. An X-ray detector as defined in claim 1, wherein the electrical resistance of said conductive rubber member is significantly higher than the electrical resistance of said long conductive member.

12. An X-ray detector as defined in claim 1, wherein said long conductive member has the shape of a wire.

* * * * *